(12) United States Patent
Narayanaswamy et al.

(10) Patent No.: US 9,407,771 B2
(45) Date of Patent: Aug. 2, 2016

(54) CALL FORWARDING ENABLE SYSTEM AND METHOD FOR MULTI-SIM DEVICE

(71) Applicant: QUALCOMM Incorporated, San Diego, CA (US)

(72) Inventors: Ashokkumar Narayanaswamy, Hyderabad (IN); Bharadwaj Kumar Cheruvu, Hyderabad (IN); Karthik Selvan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 14/453,514

(22) Filed: Aug. 6, 2014

(65) Prior Publication Data

US 2016/0044178 A1    Feb. 11, 2016

(51) Int. Cl.
*H04W 88/06* (2009.01)
*H04W 4/16* (2009.01)
*H04M 3/54* (2006.01)
*H04B 1/3816* (2015.01)
*H04W 8/18* (2009.01)

(52) U.S. Cl.
CPC .............. *H04M 3/54* (2013.01); *H04B 1/3816* (2013.01); *H04W 4/16* (2013.01); *H04W 8/183* (2013.01); *H04W 88/06* (2013.01)

(58) Field of Classification Search
None
See application file for complete search history.

(56) References Cited

U.S. PATENT DOCUMENTS

| 8,406,741 B2 | 3/2013 | Kang et al. | |
| 8,411,127 B2 | 4/2013 | Yoon | |
| 2008/0064443 A1 | 3/2008 | Shin et al. | |
| 2013/0150032 A1* | 6/2013 | Pattaswamy | H04W 52/0229 455/552.1 X |
| 2013/0217373 A1 | 8/2013 | Baek | |
| 2013/0337792 A1 | 12/2013 | Vanghi | |
| 2014/0024353 A1 | 1/2014 | Baek et al. | |

FOREIGN PATENT DOCUMENTS

WO    2010140781 A2    12/2010

OTHER PUBLICATIONS

International Search Report and Written Opinion—PCT/US2015/038154—ISA/EPO—Oct. 5, 2015.

* cited by examiner

*Primary Examiner* — Philip Sobutka
(74) *Attorney, Agent, or Firm* — Foley & Lardner LLP

(57) ABSTRACT

Various embodiments provide methods implemented on a multi-SIM-multi-active (MSMA) communication device for selectively enabling call forwarding. When the communication device is in an active data session on a first SIM, a processor in the communication device determines the data rate of a data session on a first SIM and detects whether the data rate exceeds a predefined first threshold. The processor enables call forwarding on the first SIM upon detecting that the data rate of the data session on the first SIM exceeds the predefined first threshold, to forward to a second SIM in the communication device one or more incoming calls made to the first SIM.

31 Claims, 7 Drawing Sheets

CALL FORWARDING ENABLE SYSTEM AND METHOD FOR MULTI-SIM DEVICE

BACKGROUND

1. Field

Embodiments of the present invention relate to mobile communication devices, such as smart phones configured to connect to multiple mobile telephony networks through one or more subscriptions. Embodiments of the present invention are configured to enable call forwarding from a first subscription to a second subscription, when the first subscription is in an active data session having a data rate that exceeds a predefined threshold.

2. Background

Embodiments of the present invention relate to mobile communication devices, such as smart phones configured to connect to multiple mobile telephony networks. Some mobile communication devices (Multi-SIM devices) have two or more Subscriber Identity Module ("SIM") cards that provide users with subscription access to multiple separate mobile telephony networks. Thus, the same communication device can be used for business or private use, with separate numbers and bills, or for travel, with one or more additional SIM card for each different country or region.

An example Multi-SIM device is a "dual-SIM-dual-active" or "DSDA" communication device, which includes two SIM cards/subscriptions associated with two mobile telephony networks. Some SIM cards/subscriptions support data services and voice services (or packet switching and circuit switching—PS+CS), while other SIM cards/subscriptions support only voice services (CS). In one example, a DSDA device has two transceivers with one subscription for PS+CS services and another subscription for only CS services or for other PS+CS services.

In prior systems, if a user is accessing a PS+CS subscription for a data session on a communication device and, during the data session, an incoming voice call is sent to the communication device through the same PS+CS subscription, the communication device either suspends the data session or enables a simultaneous PS+CS service through the subscription (depending upon the capability of the radio access technology for the subscription). Either way, the added voice call can degrade the data throughput of the data session. This can degrade the user's data session experience, especially when the user's data session has a relatively high data rate requirement (such as when the user is downloading a large file or streaming a video).

SUMMARY

Various embodiments provide methods, devices, and non-transitory processor-readable storage media for selectively enabling call forwarding.

In various embodiments, a multi-Subscriber-Identity-Module (SIM), multi-active communication device is configured to enable call forwarding (and automatically forward an incoming call) from one subscription (first subscriber identity modules or SIM) to another subscription (second SIM) on the same communication device, when the first subscription/SIM is in an active data session having a data rate that exceeds a first predefined threshold rate.

Some method embodiments include determining a data rate of a data session on a first SIM of the multi-SIM-multi-active communication device, detecting whether the data rate exceeds a predefined first threshold, and enabling call forwarding on the first SIM upon detecting that the data rate exceeds the predefined first threshold, to forward an incoming call to a second SIM in the multi-SIM-multi-active communication device.

In some embodiments, detecting whether the data rate exceeds the predefined first threshold may include comparing the data rate of the data session on the first SIM with a value corresponding to the predefined first threshold.

In some embodiments, the method further includes determining an average data rate for the data session on the first SIM in the multi-SIM-multi-active communication device, and determining an average data rate of a data session on the second SIM in the multi-SIM-multi-active communication device, wherein detecting that the data rate of the data session on the first SIM exceeds the predefined first threshold includes detecting that the average data rate for the data session on the first SIM exceeds the average data rate of a data session on the second SIM.

In some embodiments, determining the data rate may include determining the data rate that a base station assigned to the data session on the first SIM.

In some embodiments, the method further includes detecting an incoming call to the first SIM, wherein enabling call forwarding comprises enabling call forwarding on the first SIM in response to a combination of detecting the incoming call on the first SIM and detecting that the data rate exceeds the predefined first threshold.

In some embodiments, the method further includes detecting whether the data rate of the data session on the first SIM falls below a predefined second threshold, after enabling call forwarding on the first SIM, and disabling call forwarding on the first SIM upon detecting that the data rate of the data session on the first SIM has fallen below the predefined second threshold.

In some embodiments, the predefined second threshold is the same as the predefined first threshold. In other embodiments, the predefined second threshold is a different threshold value than the predefined first threshold.

In some embodiments, the method further includes detecting whether the second SIM in the multi-SIM-multi-active communication device is in an active data session, determining a data rate of the data session on the second SIM, upon detecting that the second SIM is in an active data session, and detecting whether the data rate of the data session on the second SIM exceeds a second predefined threshold, wherein enabling call forwarding on the first SIM includes enabling call forwarding on the first SIM in response to a combination of detecting that the data rate of the data session on the first SIM exceeds the first threshold and the data rate of the data session on the second SIM does not exceed the second threshold.

Various embodiments may include a multi-SIM-multi-active communication device configured with processor-executable instructions to perform operations of the methods described above.

Various embodiments may include a multi-SIM-multi-active communication device having means for performing functions of the operations of the methods described above.

Various embodiments may include non-transitory processor-readable media on which are stored processor-executable instructions configured to cause a processor of a multi-SIM-multi-active communication device to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the various embodiments.

DETAILED DESCRIPTION

Figure 1:
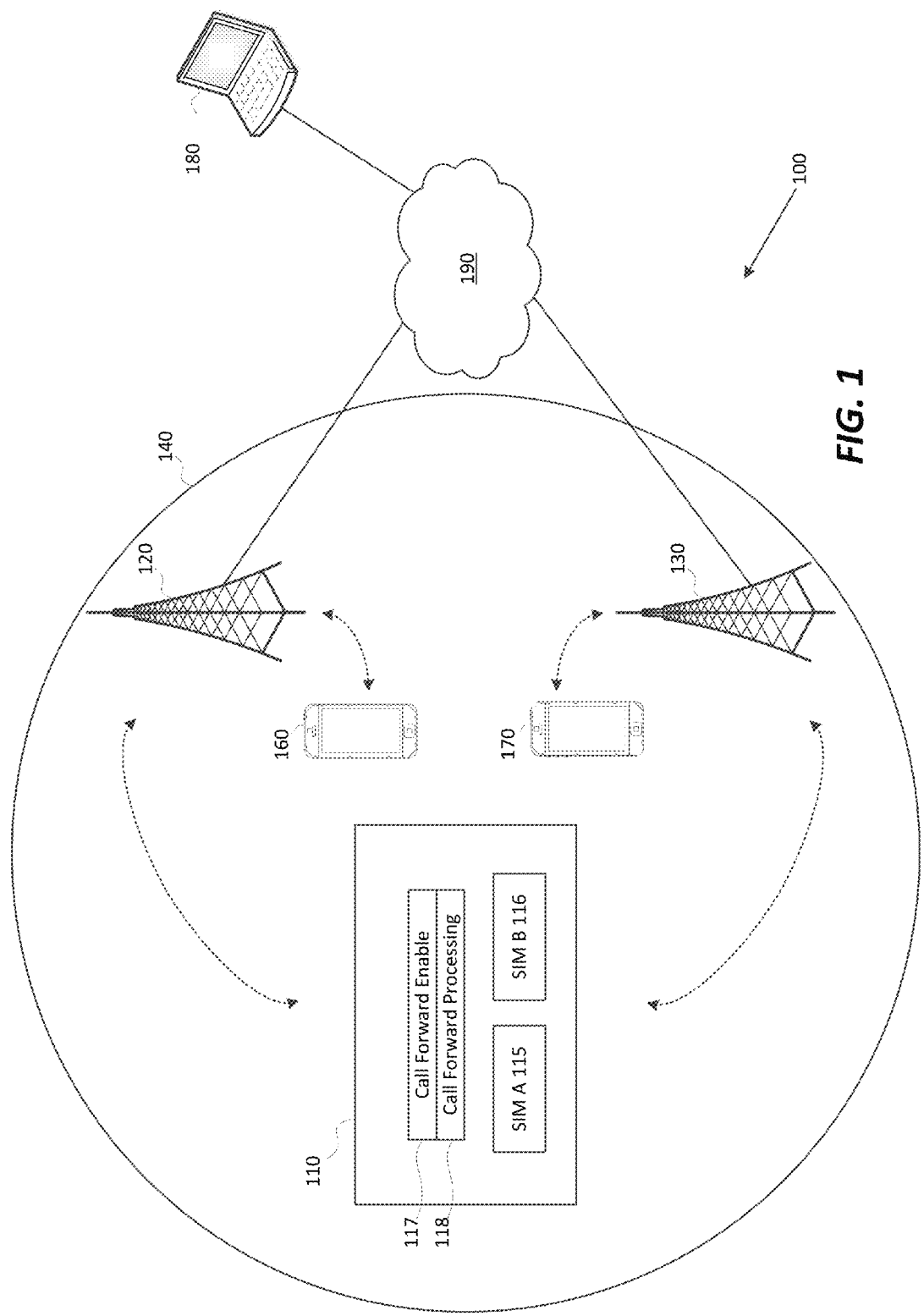
FIG. 1 is a communication system block diagram of a communication device connected for communication in a mobile telephony network in accordance with various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the invention or the claim.

Embodiments of the present invention relate to communication devices, such as multi-Subscriber-Identity-Module (SIM), multi-active communication devices or other mobile communication devices, and configurations for such communication devices that enable call forwarding (and automatically forward an incoming call) from one subscription (first SIM) to another subscription (second SIM) on the same communication device, when one or more predefined conditions are met. In particular embodiments, a predefined condition is that the first subscription/SIM is in an active data session having a data rate that exceeds a first predefined threshold rate. In further embodiments, a predefined condition is the detection of an incoming voice call sent to the communication device through the same subscription/SIM that is concurrently in an active data session having a data rate that exceeds a first predefined threshold rate.

Some modern communication devices, referred to herein as user equipment ("UE"), such as smart phones, tablet computers, and laptop computers, may contain one or more subscriber identity modules ("SIMs") that provide users of the UEs with access to one or multiple separate mobile networks, supported by radio access technologies ("RATs"). The UE may also be referred to as a mobile station ("MS"). Examples of UE include, but are not limited to, mobile phones, laptop computers, smart phones, and other mobile communication devices of the like that are configured to connect to one or more RATs. Examples of RATs may include, but are not limited to, Global Standard for Mobile ("GSM"), Code Division Multiple Access ("CDMA"), CDMA2000, Time Division-Code Division Multiple Access ("TD-CDMA"), Time Division-Synchronous Code Division Multiple Access ("TD-SCDMA"), Wideband-Code Division Multiple Access ("W-CDMA"), Time Division Multiple Access ("TDMA"), Frequency Division Multiple Access ("FDMA"), Long-Term Evolution ("LTE"), wireless fidelity ("Wi-Fi"), various 3G standards, various 4G standards, Voice Over LTE ("VOLTE"), Simultaneous GSM and LTE ("SGLTE"), Simultaneous Voice and LTE ("SVLTE"), Circuit Switched Fall Back ("CSFB"), frequency modulation ("FM"), Bluetooth ("BT"), near filed communication device ("NFC"), and the like.

Various embodiments relate to both single-SIM and multi-SIM UEs. A UE that includes a plurality of SIMs and connects to two or more separate RATs using a same set of RF resources (Radio), e.g., radio-frequency ("RF") transceivers, is a multi-SIM-multi-standby ("MSMS") communication device. In one example, the MSMS communication device may be a dual-SIM-dual-standby ("DSDS") communication device, which may include two SIM cards/subscriptions that may both be active on standby, but one is deactivated when the other one is in use. In another example, the MSMS communication device may be a triple-SIM-triple-standby ("TSTS") communication device, which includes three SIM cards/subscriptions that may all be active on standby, where two may be deactivated when the third one is in use. In other examples, the MSMS communication device may be other suitable multi-SIM communication devices, with, for example, four or more SIMs, such that when one is in use, the others may be deactivated.

Further, a UE that includes a plurality of SIMs and connects to two or more separate mobile networks using two or more separate sets of RF resources is termed a multi-SIM-multi-active ("MSMA") communication device. An example MSMA communication device is a dual-SIM-dual-active ("DSDA") communication device, which includes two SIM cards/subscriptions, each associated with a separate RAT, where both SIMs may remain active at any given time. In another example, the MSMA device may be a triple-SIM-triple-active ("TSTA") communication device, which includes three SIM cards/subscriptions, each associated with a separate RAT, where all three SIMs may remain active at any given time. In other examples, the MSMA communication device may be other suitable multi-SIM communication devices, with, for example, four or more SIMs, such that all SIMs are active at any given time.

In addition, a plurality of modes are enabled by one SIM, such that each mode may correspond to a separate RAT. Such a SIM is a multi-mode SIM. A UE may include on or more multi-mode SIMs. The UE may be a MSMS communication device (such as, but not limited to, a DSDS or a TSTS communication device), a MSMA communication device (e.g., a DSDA, TSTA communication device, or the like), or a multi-mode device.

Multi-SIM UE embodiments may support data services and voice service (PS+CS) on one SIM in the UE, but support only voice service (CS) on one or more other SIM in the UE, where PS refers to packet-switched service and CS refers to circuit-switched service. In further embodiments, multi-SIM UEs may support data services and voice service (PS+CS) on two or more SIMs in the UE. Such multi-SIM UEs may have a single set of RF resources (a single Radio) or multiple sets of RF resources (multiple Radios) to support multiple subscription services.

In particular embodiments, a DSDA device includes one subscription or SIM that supports PS+CS services and a second subscription or SIM that supports CS (but not PS) service. Other embodiments relate to other multi-SIM UE devices (or other UE devices that support multiple subscriptions) having one or more subscriptions or SIMs that support PS+CS and one or more other subscriptions or SIMs that support at least CS (i.e., either CS only or PS+CS).

UE may refer to one of a cellular telephone, smart phone, personal or mobile multimedia player, personal data assistant, laptop computer, personal computers, tablet computer, smart book, palm-top computer, wireless electronic mail receiver, multimedia Internet-enabled cellular telephone, wireless gaming controller, and similar personal electronic device that include one or more SIMs, a programmable processor, memory, and circuitry for connecting to one or more mobile communication networks (simultaneously or sequentially). Various embodiments may be useful in mobile communication devices, such as smart phones, and such devices are referred to in the descriptions of various embodiments. However, the embodiments may be useful in any electronic device, such as a DSDS, a TSTS, a DSDA, a TSTA communication device (or other suitable multi-SIM, multi-mode devices), that may individually maintain one or more subscriptions that utilize one or a plurality of separate set of RF resources.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" may also be used herein as a shorthand reference to the communication service associated with and enabled by the information (e.g., in the form of various parameters) stored in a particular SIM as the SIM and the communication network, as well as the services and subscriptions supported by that network, correlate to one another.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the UE, and thus need not be a separate or removable circuit, chip or card.

A SIM used in various embodiments may store user account information, an IMSI, a set of SIM application toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

According to various embodiments, a UE is configured to enable call forwarding (and automatically forward an incoming call) from one subscription (first SIM) to another subscription (second SIM) on the same communication device, when the first subscription/SIM is in an active data session having a data rate that exceeds a first predefined threshold rate. Particular embodiments relate to a multi-SIM UE, such as, but not limited to a DSDS device, that support data service and voice service (PS+CS) on a first SIM in the UE, and support only voice service (CS) or both data and voice services (PS+CS) on a second SIM in the UE. In such embodiments, the UE is configured to determine whether or not the data rate of an active data session in the PS domain on the first SIM exceeds a predefined first threshold value. In other embodiments, the UE is configured to detect an incoming call (for example, a voice call from another UE or other network connected device) being made to the first SIM (through the CS domain) when the UE is in an active data session (through the PS domain) on the first SIM and, then determine whether or not the data rate for the active data session exceeds a predefined first threshold value.

If the data rate for the active data session on the first SIM is determined to exceed the predefined first threshold value, then the UE enables a call forwarding routine, to forward an incoming call from the first SIM to the second SIM. In that event, the second SIM may handle the incoming call. In this manner, the incoming call need not interfere with the active data session on the first SIM. The UE user may continue with the active data session on the first SIM, as desired, without the user's experience in the data session being degraded. Thus, if the user is downloading a large file, participating in a data-intensive video game or participating in other data-intensive activity on the first SIM (resulting in a data rate that exceeds the first threshold value), the UE user can avoid experiencing delays or other degradation of the quality of service for such activities that would otherwise result from the incoming call.

On the other hand, if the data rate for active data session is determined to not exceed the predefined first threshold value, then the UE handles the incoming call on the first SIM. In that case, the UE user may be engaged in an active data session on the first SIM and be notified by the UE of the incoming call to the first SIM, such that the user may determine whether or not to disengage from the data session to answer the incoming call or, instead, continue with the data session and not answer the incoming call. Alternatively, the UE may be configured via the first SIM (or by UE hardware or software configurations) to automatically handle the incoming call through a voice messaging service.

In further embodiments, the second SIM supports PS+CS, and, upon the data rate for the active data session being determined to exceed the predefined first threshold value, but before the UE enables a call forwarding routine, the UE determines if the second SIM is in an active data session. If the second SIM is determined to be within an active data session, the UE determines whether or not the data rate for the active data session on the second SIM exceeds a predefined second threshold value. If so, then the UE does not enable call forwarding. If not, then the UE enables the call forwarding routine to forward the incoming call to the second SIM, as described.

In particular embodiments, the predefined second threshold value is the same value as the predefined first threshold value. In other embodiments, the predefined second threshold value is a different value than the predefined first threshold value. In particular embodiments, the predefined second threshold value is the set at (or as a function of) the detected data rate for the data session on the first SIM.

Various embodiments may be implemented within a variety of communication systems 100, an example of which is illustrated in FIG. 1. With reference to FIG. 1, the system 100 may include a UE 110, a first base station 120, and a second base station 130. However, a system according to further embodiments is composed of only a UE, such as UE 110, or components thereof. In other embodiments, a system includes the UE and certain other portions of the communication network such as, but not limited to one or more base stations or components thereof.

The UE 110 is configured to connect for communication with other communication devices (in PS or CS service domains), through one or more base stations, such as the base stations 120 and 130 or other base stations (not shown). Such other communication devices are represented in FIG. 1 as devices 160, 170 and 180, where each device 160, 170 and 180 may be another UE (for example operated by another user) or other network communication device configured to communicate data, voice or other information in PS or CS service domains. The base stations 120 and 130 and one or more of the other devices (such as device 180) may be connected for communication through one or more communication networks represented at 190.

In some embodiments, each of the first base station 120 and the second base station 130 may represent a separate RAT, such as GSM, CDMA, CDMA2000, TD-CDMA, TD-SCDMA, W-CDMA, TDMA, FDMA, LTE, Wi-Fi, various 3G standards, various 4G standards, VOLTE, SGLTE, SVLTE, or the like. In other words, the first base station 120 may represent a first RAT, and the second base station 130 may represent a second RAT, where the first RAT and the second RAT are different RATs. By way of illustrating with a non-limiting example, the first base station 120 may be transmitting W-CDMA while the second base station 130 may be transmitting GSM. In some embodiments, each RAT may be transmitted by the associated base station at different physical locations (i.e., the first base station 120 and the second base station 130 may be at different locations). In other embodiments, each RAT may be transmitted by the associated base station at the same physical location (i.e., the first base station 120 and the second base station 130 may be physically joined, or the base stations are the same base station).

The first base station 120 and the second base station 130 may each include at least one antenna group or transmission station located in the same or different areas, where the at least one antenna group or transmission station may be associated with signal transmission and reception. The first base station 120 and the second base station 130 may each include one or more processors, modulators, multiplexers, demodulators, demultiplexers, antennas, and the like for performing the functions described. In some embodiments, the first base station 120 and the second base station 130 may be utilized for communication with the UE 110 and may be an access point, Node B, evolved Node B (eNode B or eNB), base transceiver station (BTS), or the like.

A cell 140 may be an area associated with one or both of the first base station 120 and the second base station 130, such that the UE 110, when located within the cell 140, may connect to or otherwise access both the first and second RATs, as supported by one of or the combination of the first base station 120 and the second base station 130 (e.g., receive signals from and transmit signals to the first base station 120 and the second base station 130), respectively. The cell 140 may be a defined area, or may refer to an undefined area in which the UE 110 may access the RATs supported by the base stations.

In various embodiments, the UE 110 may be configured to access the RATs from the first base station 120 and/or the second base station 130 (e.g., receive/transmit signals of the first and/or the second RAT from/to the first base station 120 and/or the second base station 130). The UE 110 may be configured to access the RATs by virtue of the multi-SIM and/or the multi-mode SIM configuration of the UE as described, such that when a SIM corresponding to a RAT is received, the UE 110 may be allowed to access that RAT, as provided by the associated base station.

In general, an acquisition process of a RAT refers to the process in which the UE 110 searches and acquires various communication protocols of the RAT in order to acquire and establish communication or traffic with the target base node that is broadcasting the RAT. Some communication protocols include synchronization channels, such as, but not limited to, primary synchronization channel ("P-SCH"), secondary synchronization channel ("S-SCH"), common pilot channel ("CPICH"), and the like. The target base node are nodes that transmit, broadcast, or otherwise support the particular RAT being acquired. As shown in FIG. 1, the first base station 120 may be a target base node for the first RAT, given that the first RAT may be transmitted by the first base station 120 as described. Thus, when the UE 110 initiates an acquisition process of the first RAT (as supported by the first base station 120), a communication channel is set for future communication and traffic between the UE 110 and the first base station 120. Similarly, the second base station 130 may be a target base node for the second RAT, which is transmitted by the second base station 130 as described. Thus, when the UE 110 initiates an acquisition process of the second RAT, a communication channel is set for future communication and traffic between the UE 110 and the second base station 130. The acquisition process may be initiated when the UE 110 seeks to initially access the RAT, or, after attaching to an initial RAT, to identify candidate target RAT (that is not the initial RAT) for a handover.

It should be appreciated by one of ordinary skill in the art that FIG. 1 and its corresponding disclosure are for illustrative purposes, and that the system 100 may include three or more base stations. In some embodiments, three or more base stations may be present, where each of the three or more base stations may represent (i.e., transmits signals for) one or more separate RATs in the manner such as, but not limited to, described herein.

In the embodiments of FIG. 1, the UE 110 is a multi-SIM device and includes two SIMs (represented by SIM A 115 and SIM B 116). In other embodiments, the multi-SIM UE 110 includes more than two SIMs. The UE 110 is configured with a call forwarding enable elements 117 and call forwarding processing elements 118 for providing various operations (e.g., described with reference to FIGS. 3-6).

In some embodiments, the UE 110 may include a first SIM interface (not shown), which may receive a first SIM (e.g., SIM A 115), which may be associated with one or more RATs. In addition, the UE 110 may also include a second SIM interface (not shown), which may receive a second SIM (e.g., SIM B 116), which may be associated with one or more RATs that may be different (or the same in some cases) than the one or more RATs associated with SIM A 115. Each SIM may enable a plurality of RATs by being configured as a multi-mode SIM, as described. In some embodiments, a first RAT enabled may be a same or different RAT as a second RAT (e.g., a DSDS device may enable two RATs, where both of them may be GSM, or one of them may be GSM and the other may be W-CDMA). In addition, two RATs (which may be the same or different) may each be associated with a separate subscription, or both of them may be associated with a same subscription. For example, a DSDS device may enable LTE and GSM, where both of the RATs enabled may be associated with a same subscription, or, in other cases, LTE may be associated with a first subscription and GSM may be associated with a second subscription different from the first subscription.

In embodiments in which the UE 110 comprises a smart phone or other mobile phone device, the UE 110 may have existing hardware and software for telephone and other typical wireless telephone operations, as well as additional hardware and software for providing functions as described. Such existing hardware and software includes, for example, one or more input devices (such as, but not limited to keyboards, buttons, touchscreens, cameras, microphones, environmental parameter or condition sensors), display devices (such as, but not limited to electronic display screens, lamps or other light emitting devices, speakers or other audio output devices), telephone and other network communication electronics and software, processing electronics, electronic storage devices and one or more antennae and receiving electronics for receiving various RATs. In such embodiments, some of that existing electronics hardware and software may also be used in the systems and processes for functions as described.

Accordingly, such embodiments can be implemented with minimal additional hardware costs. However, other embodiments relate to systems and process that are implemented with dedicated device hardware (UE 110) specifically configured for performing operations described. Hardware and/or software for the functions may be incorporated in the UE 110 during manufacturing, for example, as part of the original equipment manufacturer's ("OEM's") configuration of the UE 110. In further embodiments, such hardware and/or software may be added to the UE 110, after manufacturing of the UE 110, such as by, but not limited to, installing one or more software applications onto the UE 110.

In some embodiments, the UE 110 may include, among other things, additional SIM(s), SIM interface(s), additional RF resource(s) (i.e., sets of RF resources) associated with the additional SIM(s), and additional antennae for connecting to additional RATs supported by the additional SIMs.

Figure 2:
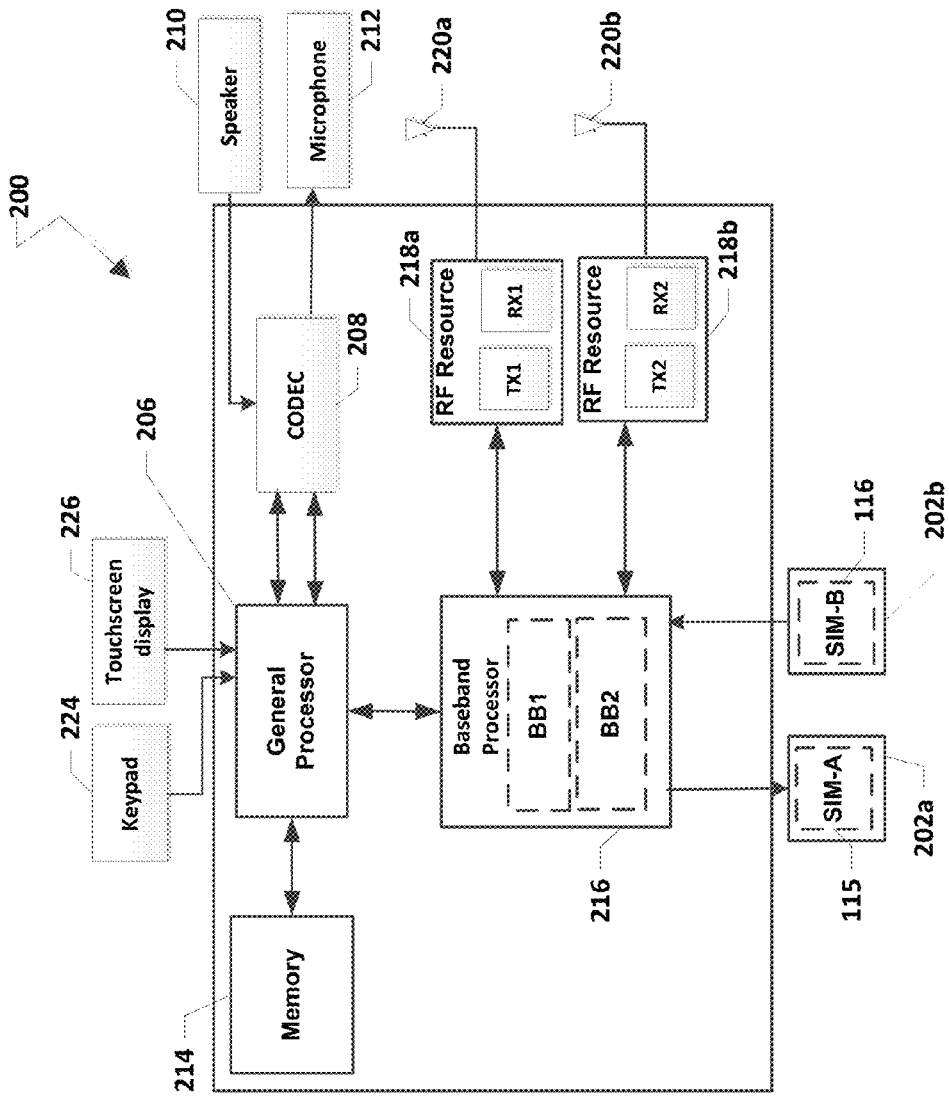
FIG. 2 is a component block diagram of a multi-SIM-multi-active communications device according to various embodiments.

FIG. 2 is a functional block diagram of an MSMA (e.g., DSDA) communication device 200 that may be employed in or as the UE 110 described with reference to FIG. 1. With reference to FIGS. 1-2, the MSMA communication device 200 may include a first SIM interface 202a, which may receive a first identity module (e.g., first SIM A 115) that is associated with a first subscription. The MSMA communication device 200 may also include a second SIM interface 202b, which may receive a second identity module (e.g., second SIM B 116) that is associated with a second subscription.

The MSMA communication device 200 may include at least one controller, or processor 206 (which may correspond to the processor 111) such as, but not limited to, a general purpose processor, which may be coupled to a coder/decoder (CODEC) 202. The processor 206 may include any suitable data processing device, such as a general-purpose processor (e.g., a microprocessor), but in the alternative, the processor 206 may be any suitable electronic processor, controller, microcontroller, or state machine. The processor 206 may also be implemented as a combination of computing devices, e.g., a combination of a DSP and a microprocessor, a plurality of microprocessors, at least one microprocessors in conjunction with a DSP core, or any other such configuration. The CODEC 202 may in turn be coupled to one or more user interface devices that may include a display and a user input device. In some embodiments, the display may include any suitable device that provides a human-perceptible visible signal, audible signal, tactile signal, or any combination thereof, including, but not limited to a touchscreen, LCD, LED, CRT, plasma, or other suitable display screen, audio speaker 204 or other audio generating device, combinations thereof, and the like. In various embodiments, the user input device may include any suitable device that receives input from the use, the user input device including, but not limited to one or more manual operator (such as, but not limited to a switch, button, touchscreen, knob, slider or the like), microphone 206, camera, image sensor, and the like The processor 206 may also be coupled to at least one memory 214. The memory 214 may be a non-transitory processor-readable storage medium that stores processor-executable instructions, including, but not limited to, random access memory RAM, read only memory ROM, floppy disks, hard disks, dongles or other RSB connected memory devices, or the like. For example, the instructions may include routing communication data relating to the first or second subscription though a corresponding baseband-RF resource chain. The memory 214 may store an operating system (OS), as well as user application software and executable instructions. The memory 214 may also store application data, such as an array data structure.

The general purpose processor 206 and the memory 214 may each be coupled to at least one baseband modem processor 216. Each SIM in the MSMA communication device 200 (e.g., the first SIM A 115 and the second SIM B 116) may be associated with baseband-RF resources. In some embodiments, the RF resources may be one set of RF resources such that only one RAT may be supported by the set of RF resources at any given time. In other embodiments, the RF sources may be a plurality of sets of RF resources, such that each set may support one RAT at a given time, thus enabling the communication device 200 to support multiple RATs simultaneously (e.g., in a MSMA case). The RF resources may include at least one baseband-RF resource chain (with which each SIM in the MSMA communication device 200, e.g., the SIM A 115 and the SIM B 116, may be associated). The baseband-RF resource chain may include a baseband modem processor, which may perform baseband/modem functions for communications on at least one SIM, and may include one or more amplifiers and radios. In some embodiments, baseband-RF resource chains may share the baseband modem processor (i.e., a single device that performs baseband/modem functions for all SIMs on the MSMA communication device 200). In other embodiments, each baseband-RF resource chain may include physically or logically separate baseband processors.

A baseband-RF resource chain may include the baseband modem processor 216, which may perform baseband/modem functions for communications on at least one SIM, and may include one or more amplifiers and radios, referred to generally herein as RF resources 218a, 218b. In some embodiments, baseband-RF resource chains may share the baseband modem processor 216 (i.e., a single device that performs baseband/modem functions for all SIMs on the MSMA communication device 200). In other embodiments, each baseband-RF resource chain may include physically or logically separate baseband processors (e.g., BB1, BB2).

The RF resources 218a, 218b may each be transceivers that perform transmit/receive functions for the associated SIM of the MSMA communication device 200. The RF resources 218a, 218b may include separate transmit and receive circuitry, or may include a transceiver that combines transmitter and receiver functions. The RF resources 218a, 218b may each be coupled to a wireless antenna (e.g., a first wireless antenna 220a or a second wireless antenna 220b). The RF resources 218a, 218b may also be coupled to the baseband modem processor 216.

In some embodiments, the general purpose processor 206, the memory 214, the baseband processor(s) 216, and the RF resources 218a, 218b may be included in the MSMA communication device 200 as a system-on-chip. In some embodiments, the first and second SIMs (SIM A 115 and SIM B 116) and their corresponding interfaces 204a, 204b may be external to the system-on-chip. Further, various input and output devices may be coupled to components on the system-on-chip, such as interfaces or controllers. Example user input components suitable for use in the MSMA communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the MSMA communication device 200 to enable communication between them, as is known in the art.

In some embodiments (not shown), the MSMA communication device 200 may include, among other things, additional SIM cards, SIM interfaces, a plurality of RF resources associated with the additional SIM cards, and additional antennae for connecting to additional mobile networks.

In particular embodiments, the MSMA communication device 200 is a DSDA device, the first SIM A 115 supports PS+CS and operates with a first set of radio resources 114, while the second SIM B 116 supports CS only and operates with a second set of radio resources 114. In other embodiments, the second SIM B 116 also supports PS+CS.

According to various embodiments, the UE 110 is configured to enable call forwarding on a first subscription (e.g., the first SIM A 115), to automatically forward any incoming call from a first subscription (e.g., the first SIM A 115) to a second subscription or SIM (e.g., the second SIM B 116), when an active data session on the first subscription (e.g., the first SIM A 115) has a data rate that exceeds a predefined first threshold value $T_1$. Therefore, if the UE 110 is conducting an active data session on a first subscription (e.g., the first SIM A 115) with a data rate greater than $T_1$ when a voice call is received on the same subscription (e.g., the first SIM A 115), the UE 110 automatically forwards the incoming call to a second subscription (e.g., the second SIM B 116). In this manner, the UE 110 is able to continue the active data session through the first subscription (e.g., the first SIM A 115), while forwarding the incoming call to the second subscription (e.g., the second SIM B 116).

In particular embodiments, the UE 110 is further configured to disable call forwarding on the first subscription (e.g., the first SIM A 115), if the data rate for the active data session is below the predefined first threshold value $T_1$ (or below another predefined threshold value $T_2$) such that subsequent incoming calls on the first subscription (e.g., the first SIM A 115) are not automatically forwarded. In further embodiments, call forwarding is disabled, only after the data rate remains below the threshold for a preset time period (e.g., determined by a hysteresis timer). This may avoid a ping-pong effect (repeated enabling and disabling call forwarding within a short period of time) and reduce signaling load on the network. The hysteresis timer may be set to any appropriate time period such as, but not limited to a time period within the range of 10-30 seconds.

The predefined first threshold value $T_1$ may be any appropriate rate value such as, but not limited to, 100 Kilobits per second (KBPS). In particular embodiments, the predefined first threshold value $T_1$ is variable and is set to a value that is dependent on the network services available. For example, if the network supports 3G, the threshold may be (but not limited to) a predefined value in the range of 100 to 300 KBPS. If the network supports 4G or LTE, the threshold may be (but not limited to) a predefined value in the range of 1 to 2 Megabits per second (MBPS). In other embodiments, other suitable values may be employed for the predefined first threshold value $T_1$.

In particular embodiments, the UE 110 is configured to enable unconditional call-forwarding of a call from one subscription or SIM (that has PS+CS services and an active data session) to another subscription or SIM (that has only CS service or is currently in PS Idle mode) when the data rate in the active data session is greater than the predefined first threshold value $T_1$. If the UE 110 has two or more subscriptions or SIMs that support PS+CS services, then unconditional call forwarding may be enabled from either one of those subscriptions or SIMs to another one of those subscriptions or SIMs that is not in an active data session (or to a CS only subscription or SIM on the UE 110), when an active data session is ongoing on the same subscription service as the incoming call and the data rate for the active data session exceeds the predefined first threshold value $T_1$.

If the UE 110 has two or more subscriptions or SIMs that support PS+CS services, then the UE 110 can be configured to select one of those subscriptions or SIMs, for example, randomly. The UE can be further configured such that, if more than one of the subscriptions or SIMs is servicing an active data session, the UE 110 determines which subscription or SIM to forward the call, based on the data rates for each of the active data sessions, such as, by selecting the SIM that has the lowest data rate to be the SIM to which an incoming call is to be forwarded. In further embodiments, the UE can be configured such that, if more than one of the subscriptions or SIMs is servicing an active data session, the UE 110 determines which subscription or SIM to forward the call, based on the average data rates for the active data sessions or other algorithm. Accordingly, a call can be forwarded from a subscription or SIM that has a higher average data rate to a subscription or SIM that has a lower average data rate.

Figure 3:
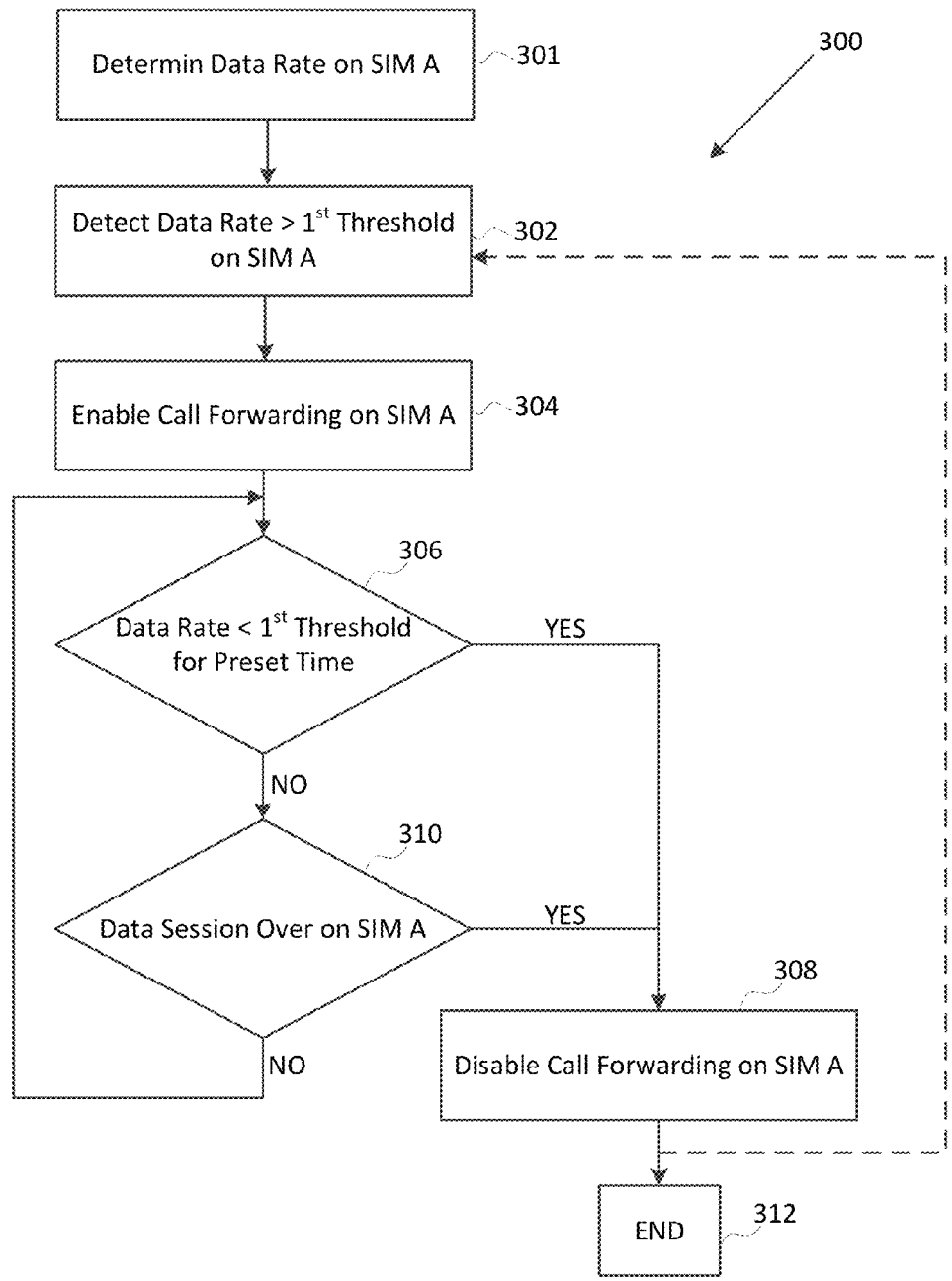
FIG. 3 is a process flowchart illustrating a process for selectively enabling call forwarding according to various embodiments.

A process 300 according to various embodiments is described with reference to FIG. 3. With reference to FIGS. 1-3, in particular embodiments, the processor 206 in the MSMA communication device 200 is configured to operate according to the process 300, and includes or operates with a first subscription (on a first SIM A 115) that is capable of providing data and voice services (PS+CS), and a second subscription (on a second SIM B 116) that is capable of providing voice services (CS). In certain embodiments, the second subscription (or second SIM B 116) provides only voice services (CS only). In other embodiments, the second subscription (or second SIM B 116) provides data and voice services (PS+CS).

In particular embodiments, the MSMA communication device 200 is configured to perform the process 300 when a subscription (SIM) on the MSMA communication device 200 engages in an active data session. For example, the MSMA communication device 200 may engage in an active data session on a subscription (SIM), such as the first subscription (first SIM A 115), with one or more other network-connected devices (such as, but not limited to one or more of the devices 160, 170 or 180 in FIG. 1).

In the process 300, the MSMA communication device 200 (at 301) determines a data rate of an active data session on a first subscription (first SIM A 115) of the MSMA communication device 200, and (at 302) detects whether that the data rate exceeds a predefined first threshold value $T_1$. For example, the MSMA communication device 200 may be configured to monitor subscriptions or SIMs, or to respond to signals or other settings associated with an ongoing data session, to determine that an active data session is being carried out on a subscription or SIM, and to detect the data rate for that data session.

In particular embodiments, the data rate assigned by a network entity (such as the base station 120 or 130) to the ongoing, active data session is used by the MSMA communication device 200 as the detected data rate for the active data session. In other embodiments, the MSMA communication device 200 or other suitable network connected device is configured to detect an actual rate of data transfer in the active data session for example, by monitoring the actual data rate over time and determining an average, moving average, instantaneous or other value based on the monitored data rate.

In particular embodiments, the detection (at 302) may be made by comparing a data rate for the active data session with the pre-stored first threshold value $T_1$. In other embodiments, the detection (at 302) is made in accordance with an algorithm that employs the detected data rate to derive a result that represents whether or not the detected data rate exceeds the predefined first threshold value $T_1$.

Upon a detection (at 302) that the data rate for the data session on the first subscription (first SIM A 115) enables call forwarding (at 304) on the first subscription (first SIM A 115). Thereafter, any incoming call to the first subscription (first SIM A 115) is automatically forwarded to the second subscription (second SIM B 116) in the MSMA communication device 200. In other embodiments, upon a detection (at 302) that the data rate for the data session on the first subscription (first SIM A 115) exceeds the predefined first threshold value $T_1$, the process 300 prompts the user with a notification (e.g., on a display of the MSMA communication device 200) informing the user that automatic forwarding may be enabled by providing a predefined user input (e.g., through a user interface of the MSMA communication device 200). Prior to the determination 302, it is assumed that call forwarding is disabled for all subscriptions (SIMs) in the MSMA communication device 200. However, in further embodiments, one or more of the subscriptions (SIMs) in the MSMA communication device 200 may have call forwarding enabled through a manual setting or other routines.

In particular embodiments, when call forwarding is enabled (at 304) and, thereafter, a call is forwarded from the first subscription (first SIM A 115) to the second subscription (second SIM B 116), the incoming call is then handled by the second subscription (second SIM B 116) in a conventional manner of handling an incoming call. In particular embodiments, the second subscription (second SIM B 116) is configured to detect the forwarded, incoming call and notify the MSMA communication device 200 user of the incoming call, forward the incoming call to a voice mail service, process the incoming call in another pre-defined manner, or any combination thereof. In embodiments in which the second subscription (second SIM B 116) notifies the user of the incoming call, the MSMA communication device 200 may be configured to provide such a notification in any suitable manner to indicate that a call is being made to the second subscription (second SIM B 116) including, but not limited to displaying a visual message (text, icon or other indicia) on a display screen of the MSMA communication device 200, an audible message (recorded or generated voice, tone signal or other sound), a tactile message (vibration, heat or other tactile signal), or any combination thereof. Upon receiving a notification of an incoming call, the MSMA communication device 200 user may then decide to answer the incoming call on the second subscription (second SIM B 116) or, alternatively, may decide to continue with the data session on the first subscription (first SIM A 115) without interruption by not answering the call on the second subscription (second SIM B 116).

Once call forwarding is enabled (at 304), the process 300 determines at 306 whether or not the data rate for the data session on the first subscription (first SIM A 115) has fallen below the predefined first threshold value $T_1$. In particular embodiments, the determination 306 is YES (that the data rate has fallen below the predefined first threshold value $T_1$) after the MSMA communication device 200 determines that the data rate remains below the threshold for the duration of a preset time period (e.g., determined by a timer, such as a hysteresis timer) as described. The hysteresis timer may be included in or otherwise associated with the processor 111 of the MSMA communication device 200. While the determination 306 employs the same predefined first threshold value $T_1$ as employed for the determination 302, other embodiments may employ a different threshold value for the determination 306 than used in the determination 302.

Upon a YES determination at 306, indicating that the data rate has fallen below the predefined first threshold value $T_1$ for the duration of the preset time period, the MSMA communication device 200 disables call forwarding (at 308) on the on the first subscription (first SIM A 115). Accordingly, a call received on the first subscription (first SIM A 115) after call forwarding has been disabled (at 308) will be handled by the first subscription (first SIM A 115) in the normal manner of handling an incoming call. After disabling call forwarding (at 308), the process 300 may return to 302 (as represented by the broken line path in FIG. 3) to monitor subscriptions (SIMs) for data sessions having a data rate that exceeds the predefined first threshold value $T_1$. In other embodiments, the process 300 ends at 312 after disabling call forwarding (at 308).

On the other hand, upon a NO determination at 306, indicating that the detected data rate has not been determined to have fallen below the predefined first threshold value $T_1$ for the duration of the preset time period, the MSMA communication device 200 determines at 310 whether or not the data session on the first subscription (first SIM A 115) has ended. For example, the MSMA communication device 200 may be configured to monitor the first subscription (first SIM A 115) or to respond to signals or other settings associated with the first subscription (first SIM A 115), to determine whether or not an active data session is being carried out on that subscription (SIM).

Upon a YES determination at 310, indicating that the data session on the first subscription (first SIM A 115) has ended, the process 300 may end at 312. In some embodiments, the MSMA communication device 200 is configured to disable call forwarding, upon a YES determination at 310 and before the process 300 ends at 312. In some embodiments, the process 300 returns to 302 to monitor subscriptions (SIMs) for data sessions having a data rate that exceeds the predefined first threshold value $T_1$, instead of ending at 312.

On the other hand, upon a NO determination at 310, indicating that the data session on the first subscription (first SIM A 115) has not ended, the process 300 may return to 306 to again determine whether or not the data rate for the data session on the first subscription (first SIM A 115) falls below the predefined first threshold value $T_1$ for the duration of the preset time period. In this manner, the MSMA communication device 200 is configured to continue to monitor whether or not the data rate falls below the predefined first threshold value $T_1$, until either the data session on the first subscription (first SIM A 115) is determined to be over or the monitored data rate is determined to fall below the predefined first threshold value $T_1$ for the duration of the preset time period.

Figure 4:
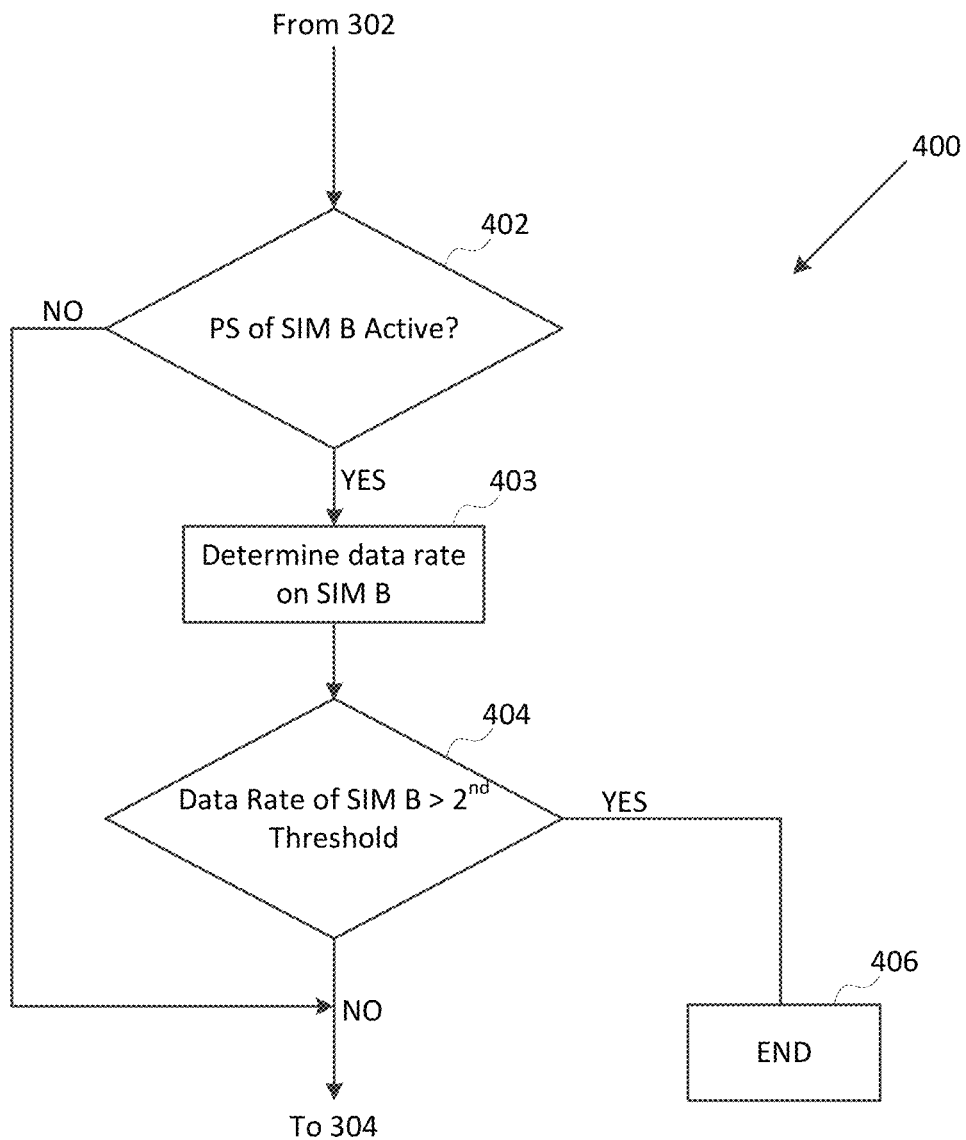
FIG. 4 is a process flowchart illustrating a process for selectively enabling call forwarding according to various embodiments.
Figure 5:
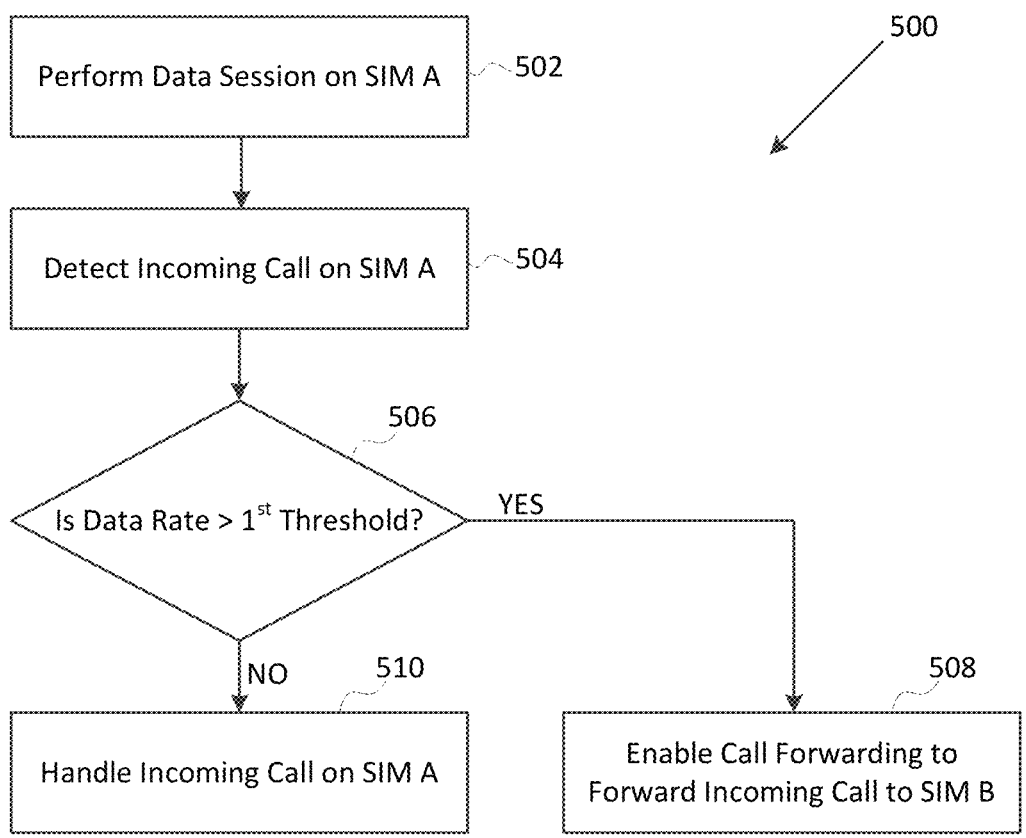
FIG. 5 is a process flowchart illustrating a process for selectively enabling call forwarding according to various embodiments.
Figure 6:
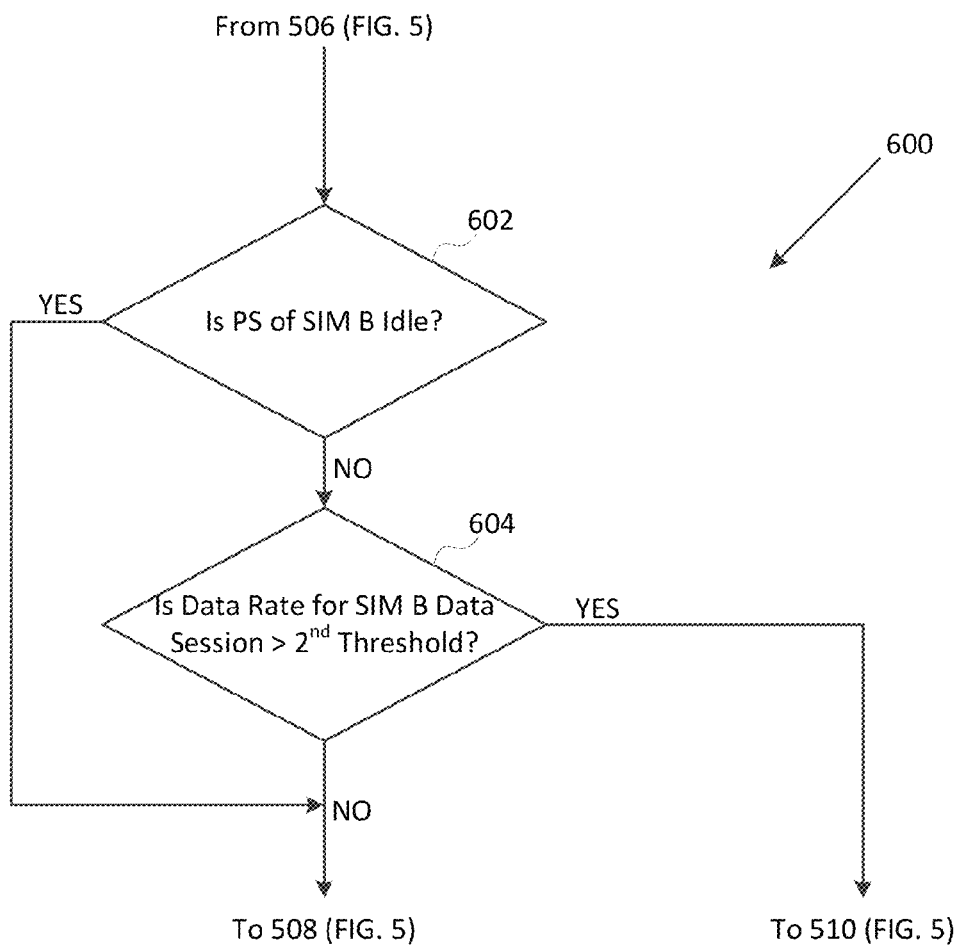
FIG. 6 is a process flowchart illustrating a process for selectively enabling call forwarding according to various embodiments.

In further embodiments, the process 300 includes a further process 400 shown in FIG. 4 relating to the data rate status of the second subscription (second SIM B 116). With reference to FIGS. 1-4, in such further embodiments, the second subscription (second SIM B 116) supports both data and voice services (PS+CS). In such further embodiments, the process 400 may be carried out after the determination (at 302) in process 300 that the data rate of an active data session on the first subscription (first SIM A 115) exceeds a predefined first threshold value $T_1$, and before (or instead of) enabling call forwarding (at 304).

In particular, upon a determination at 302 (in FIG. 3) that the data rate of an active data session on the first subscription (first SIM A 115) exceeds a predefined first threshold value $T_1$, a determination 402 is made regarding whether or not the second subscription (second SIM B 116) is in an active mode for an active data session (instead of a PS Idle mode). Upon a determination at 402 of NO (that the second subscription (second SIM B 116) is not in an active data session (i.e., is in PS Idle mode)), the process 400 proceeds to enable call forwarding at 304.

On the other hand, a determination at 402 of YES (that the second subscription (second SIM B 116) is in an active data session (i.e., is not in PS Idle mode)), the process 400 proceeds to determine at 403 the data rate of the active data session on SIM B and, then, to detect at 404 whether or not the data rate of the active data session on the second subscription (second SIM B 116) exceeds a predefined second threshold $T_2$. This detection 404 may be made in any suitable manner such as, but not limited to the manner in which the detection at 302 is made. In particular embodiments, the predefined second threshold $T_2$ is the same threshold rate value as the predefined first threshold $T_1$ used at 302. In other embodiments, the predefined second threshold $T_2$ is a different predefined rate value relative to the predefined first threshold $T_1$.

Upon a detection (at 404) that the data rate does not exceed the predefined second threshold rate value (NO at 404), the process 400 enables call forwarding (at 304). On the other hand, upon a determination (at 404) that the data rate exceeds the predefined second threshold $T_2$ (YES at 404), the process 400 (and the process 300) may end at 406. That is, call forwarding is not enabled at this time. Alternatively, in embodiments in which the UE 110 has more than two subscriptions (SIMs), the MSMA communication device 200 may be configured to select another subscription (SIM) to be the recipient of forwarded calls.

In further embodiments in which the MSMA communication device 200 has two or more subscriptions or SIMs that support PS+CS services, then the MSMA communication device 200 can be configured to select one of those subscriptions or SIMs, for example, randomly, according to a predefined list, or in any other suitable manner, to be the recipient of forwarded calls when call forwarding is enabled at 304. The MSMA communication device 200 can be further configured such that, if at the determination 302, more than one of the subscriptions or SIMs on the MSMA communication device 200 is servicing an active data session, the MSMA communication device 200 determines which subscription or SIM to forward the call, based on the average data rates for the active data sessions or other algorithm. According to such embodiments, a call is forwarded from a subscription or SIM that has a higher average data rate to a subscription or SIM that has a lower average data rate.

In various embodiments, call forwarding is enabled (at 304) before an incoming call occurs during a data session on the first subscription (first SIM A 115). In further embodiments, as represented by the processes 500 and 600 in FIGS. 5 and 6, a determination is made as to whether or not to enable call forwarding to forward an incoming call, upon a detection of the incoming call on the first subscription (first SIM A 115). With reference to FIGS. 1-6, in such further embodiments, the processor 206 in MSMA communication device 200 may be configured to operate according to the process 500 or 600.

In the process 500, the first subscription (first SIM A 115) is performing an active data session at 502, for example, on a first radio device of the UE 110. While in the active data session, a call is made to the first subscription (first SIM) from another network device (e.g., one of the devices 160, 170 or 180 in FIG. 1). Accordingly, in the process 500, the MSMA communication device 200 detects at 504 an incoming call on the first subscription (first SIM).

Upon detection of an incoming call, the MSMA communication device 200 determines at 506 whether or not the data rate of the active data session exceeds a predefined threshold rate. This determination 506 may be made, for example, in a manner similar to the determination 302.

Upon a determination (at 506) that the data rate exceeds the predefined first threshold value (YES at 506), the process 500 enables call forwarding (at 508), such that the incoming call is forwarded to the second subscription (second SIM B 116) in the MSMA communication device 200. In particular embodiments, the incoming call is then handled by the second subscription (second SIM B 116) in a conventional manner of handling an incoming call, for example, as described.

On the other hand, upon a determination (at 506) that the detected data rate does not exceed the predefined first threshold value (NO at 506), the process 500 proceeds to handle the incoming call at 510 on the first subscription (first SIM), without enabling call forwarding for that call. Because the data rate of the active data session concurrently being handled by the first subscription (first SIM) is below the predefined threshold, the additional processing for handling the incoming call on the first subscription (first SIM) does not adversely affect the data session (or has an acceptable effect on the data session).

In further embodiments, the process 500 includes the further process 600 relating to the data rate status of the second subscription (second SIM B 116). In such further embodiments, the second subscription (second SIM B 116) has both data and voice services (PS+CS). In the further process 600, a determination 602 is made, after a YES determination at 506 and before (or instead of) the call forwarding at 508. More specifically, upon a YES determination at 506, the process 600 determines at 602 if the data service (PS) of the second subscription (second SIM) is in an IDLE mode. If the data service (PS) of the second subscription (second SIM) is in an IDLE state (YES at 602), then the process 600 proceeds to call forwarding (at 508 in FIG. 5).

On the other hand, if the data service (PS) of the second subscription (second SIM) is not in an IDLE state (NO at 602), then the process 600 proceeds to determine at 604 whether or not the data rate of the active data session on the second subscription (second SIM) exceeds a predefined second threshold rate. This determination 604 may be made in any suitable manner such as, but not limited to the manner in which the determination at 506 is made. In particular embodiments, the predefined second threshold rate is the same threshold rate as the predefined first threshold rate used at 506. In other embodiments, the predefined second threshold rate is one or more other predefined rates.

Upon a determination (at 604) that the data rate does not exceed the predefined second threshold rate value (NO at 604), the process 600 enables call forwarding (at 508). On the other hand, upon a determination (at 604) that the data rate exceeds the predefined second threshold value (YES at 604), the process 600 proceeds to 510, to handle the incoming call on the first subscription (first SIM A 115).

Figure 7:
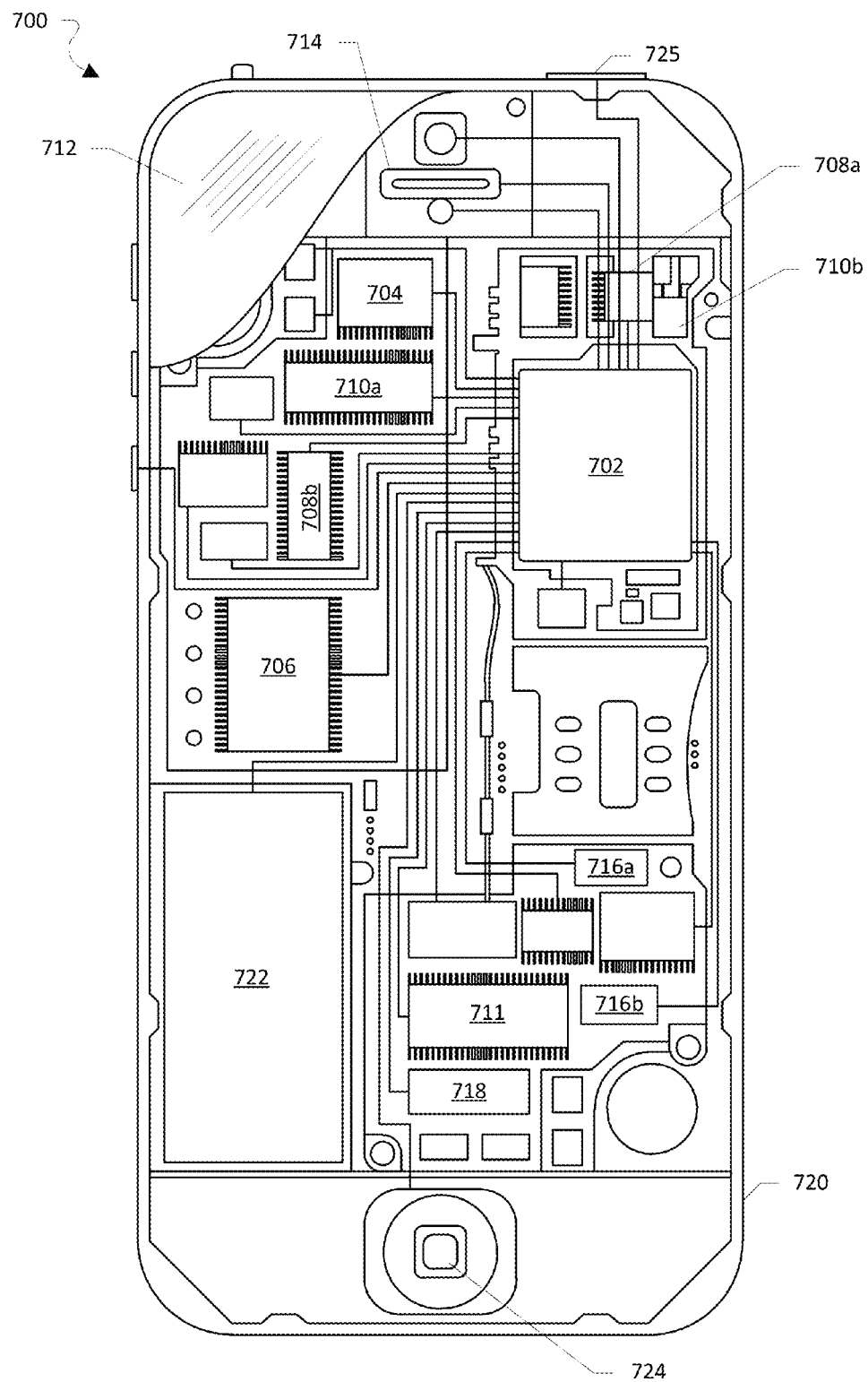
FIG. 7 is a component block diagram of a user equipment suitable for use with various embodiments.

The various embodiments may be implemented in any of a variety of mobile communication devices, an example of which (mobile communication device 700, which may correspond to the UE 110 in FIG. 1 and MSMA communication device 200 in FIG. 2) is illustrated in FIG. 7. As such, the mobile communication device 700 may implement the processes and/or the methods of FIGS. 3-6 as described.

With reference to FIGS. 1-7, the mobile communication device 700 may include a processor 702 coupled to a touchscreen controller 704 and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the mobile communication device 700 need not have touch screen capability.

The mobile communication device 700 may have one or more cellular network transceivers 708a, 708b coupled to the processor 702 and to two or more antennae 710 and configured for sending and receiving cellular communications. The transceivers 708 and antennae 710a, 710b may be used with the above-mentioned circuitry to implement the various embodiment methods. The mobile communication device 700 may include two or more SIM cards 716a, 716b coupled to the transceivers 708a, 708b and/or the processor 702 and configured as described above. The mobile communication device 700 may include a cellular network wireless modem chip 711 that enables communication via a cellular network and is coupled to the processor.

The mobile communication device 300 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe. The peripheral device connection interface 718 may also be coupled to a similarly configured peripheral device connection port (not shown).

The mobile communication device 700 may also include speakers 714 for providing audio outputs. The mobile communication device 700 may also include a housing 720, constructed of a plastic, metal, or a combination of materials, for containing all or some of the components of the mobile communication device 700. The mobile communication device 700 may include a power source 722 coupled to the processor 702, such as a disposable or rechargeable battery. The rechargeable battery may also be coupled to a peripheral device connection port (not shown) to receive a charging current from a source external to the mobile communication device 700. The mobile communication device 700 may also include a physical button 724 for receiving user inputs. The mobile communication device 700 may also include a power button 726 for turning the mobile communication device 700 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method implemented on a multi-Subscriber-Identity-Module (SIM), multi-active communication device for selectively enabling call forwarding, the method comprising:
   determining a data rate of a data session on a first SIM of the multi-SIM-multi-active communication device;
   detecting whether the data rate exceeds a predefined first threshold; and
   enabling call forwarding on the first SIM upon detecting that the data rate exceeds the predefined first threshold to forward an incoming call over the first SIM to a second SIM in the multi-SIM-multi-active communication device.

2. The method of claim 1, wherein detecting whether the data rate exceeds the predefined first threshold comprises comparing the data rate of the data session on the first SIM with a value corresponding to the predefined first threshold.

3. The method of claim 1, further comprising detecting the incoming call to the first SIM, wherein enabling call forwarding comprises enabling call forwarding on the first SIM in response to detecting the incoming call on the first SIM and detecting that the data rate exceeds the predefined first threshold.

4. The method of claim 1, further comprising:
   detecting whether the data rate of the data session on the first SIM falls below a predefined second threshold, after enabling call forwarding on the first SIM; and
   disabling call forwarding on the first SIM in response to detecting that the data rate of the data session on the first SIM has fallen below the predefined second threshold.

5. The method of claim 4, wherein the predefined second threshold is the same as the predefined first threshold.

6. The method of claim 4, wherein the predefined second threshold is a different threshold value than the predefined first threshold.

7. The method of claim 1, further comprising:
   detecting whether the second SIM in the multi-SIM-multi-active communication device is in an active data session;
   determining a data rate of the data session on the second SIM, upon detecting that the second SIM is in an active data session; and
   detecting whether the data rate of the data session on the second SIM exceeds a second predefined threshold;
   wherein enabling call forwarding on the first SIM comprises enabling call forwarding on the first SIM in response to detecting that the data rate of the data session on the first SIM exceeds the first threshold and the data rate of the data session on the second SIM does not exceed the second threshold.

8. The method of claim 7, wherein the predefined second threshold is the same as the predefined first threshold.

9. The method of claim 7, wherein the predefined second threshold is a different threshold value than the predefined first threshold.

10. The method of claim 7, further comprising enabling call forwarding on the first SIM for forwarding a call to a third SIM in the multi-SIM-multi-active communication device, upon detecting that the data rate of the data session on the first SIM exceeds the predefined first threshold and that the data rate of the data session on the second SIM exceeds the predefined second threshold.

11. The method of claim 1, wherein enabling call forwarding on the first SIM comprises automatically enabling call forwarding on the first SIM upon detecting that the data rate exceeds the predetermined first threshold.

12. The method of claim 1, wherein enabling call forwarding on the first SIM comprises providing a user-perceptible prompt and receiving a user input to enable call forwarding on the first SIM upon detecting that the data rate exceeds the predetermined first threshold.

13. The method of claim 1, wherein enabling call forwarding on the first SIM comprises transferring an incoming call on the first SIM to the second SIM such that the incoming call may be received on the second SIM.

14. The method of claim 1, wherein the first SIM supports circuit switching and packet switching (CS+PS) services, while the second SIM supports circuit switching services (CS) but not packet switching services (PS).

15. The method of claim 1, wherein the first SIM supports circuit switching and packet switching (CS+PS) services, and the second SIM supports circuit switching and packet switching (CS+PS) services.

16. The method of claim 1, further comprising:
   determining an average data rate for the data session on the first SIM in the multi-SIM-multi-active communication device; and
   determining an average data rate of a data session on the second SIM in the multi-SIM-multi-active communication device;
   wherein detecting that the data rate of the data session on the first SIM exceeds the predefined first threshold comprises detecting that the average data rate for the data session on the first SIM exceeds the average data rate of the data session on the second SIM.

17. A multi-Subscriber-Identity-Module (SIM), multi-active communication device, comprising:
   a memory;
   a plurality RF resources, including at least one set of RF resources for supporting a data session on a first SIM in the multi-SIM-multi-active communication device; and
   a processor coupled to the memory and the plurality of RF resources, wherein the processor is configured to:
      determine a data rate of the data session on the first SIM of the multi-SIM-multi-active communication device;
      detect whether the data rate exceeds a predefined first threshold; and enable call forwarding on the first SIM upon detecting that the data rate exceeds the predefined first threshold, to forward an incoming call over the first SIM to a second SIM in the multi-SIM-multi-active communication device.

18. The multi-SIM-multi-active communication device of claim 17, wherein the processor is configured to detect whether the data rate exceeds the predefined first threshold by comparing the data rate of the data session on the first SIM with a value corresponding to the predefined first threshold.

19. The multi-SIM-multi-active communication device of claim 17, wherein the processor is further configured to detect the incoming call to the first SIM, and to enable call forwarding on the first SIM in response to detecting the incoming call on the first SIM and detecting that the data rate of the data session on the first SIM exceeds the predefined first threshold.

20. The multi-SIM-multi-active communication device of claim 17, wherein the processor is further configured to:
    detect whether the data rate of the data session on the first SIM falls below a predefined second threshold, after enabling call forwarding on the first SIM; and
    disable call forwarding on the first SIM in response to detecting that the data rate of the data session on the first SIM has fallen below the predefined second threshold.

21. The multi-SIM-multi-active communication device of claim 20, wherein the predefined second threshold is the same as the predefined first threshold.

22. The multi-SIM-multi-active communication device of claim 20, wherein the predefined second threshold is a different threshold value than the predefined first threshold.

23. The multi-SIM-multi-active communication device of claim 17, wherein the processor is further configured to:
    detect whether the second SIM in the multi-SIM-multi-active communication device is in an active data session;
    determine a data rate of the data session on the second SIM, upon detecting that the second SIM is in an active data session;
    detect whether the data rate of the data session on the second SIM exceeds a predefined second threshold; and
    enable call forwarding on the first SIM in response to detecting that the data rate of the data session on the first SIM exceeds the predefined first threshold and the data rate of the data session on the second SIM does not exceed the predefined second threshold.

24. The multi-SIM-multi-active communication device of claim 23, further comprising enabling call forwarding on the first SIM for forwarding a call to a third SIM in the multi-SIM-multi-active communication device, upon detecting that the data rate of the data session on the first SIM exceeds the predefined first threshold and that the data rate of the data session on the second SIM exceeds the predefined second threshold.

25. The multi-SIM-multi-active communication device of claim 17, wherein enabling call forwarding on the first SIM comprises providing a user-perceptible prompt and receiving a user input to enable call forwarding on the first SIM upon detecting that the data rate exceeds the predetermined first threshold.

26. The multi-SIM-multi-active communication device of claim 17, wherein enabling call forwarding on the first SIM comprises transferring an incoming call on the first SIM to the second SIM such that the incoming call may be received on the second SIM.

27. The multi-SIM-multi-active communication device of claim 17, wherein the first SIM supports circuit switching and packet switching (CS+PS) services, while the second SIM supports circuit switching services (CS) but not packet switching services (PS).

28. The multi-SIM-multi-active communication device of claim 17, wherein the first SIM supports circuit switching and packet switching (CS+PS) services, and the second SIM supports circuit switching and packet switching (CS+PS) services.

29. A non-transitory processor-readable storage medium having stored thereon processor-executable instructions configured to cause a processor of a multi-Subscriber-Identity-Module (SIM), multi-active communication device to perform operations comprising:
    determining a data rate of a data session on a first SIM of the multi-SIM-multi-active communication device;
    detecting whether the data rate exceeds a predefined first threshold; and
    enabling call forwarding on the first SIM upon detecting that the data rate exceeds the predefined first threshold, to forward an incoming call over the first SIM to a second SIM in the multi-SIM-multi-active communication device.

30. A multi-Subscriber-Identity-Module (SIM), multi-active communication device, comprising:
    means for determining a data rate of a data session on a first SIM of the multi-SIM-multi-active communication device;
    means for detecting whether the data rate exceeds a predefined first threshold; and
    means for enabling call forwarding on the first SIM upon detecting that the data rate exceeds the predefined first threshold, to forward an incoming call over the first SIM to a second SIM in the multi-SIM-multi-active communication device.

31. The method of claim 1, further comprising continuing the data session on the first SIM while forwarding the incoming call to the second SIM.

* * * * *